(12) United States Patent
Baker et al.

(10) Patent No.: US 11,053,618 B2
(45) Date of Patent: *Jul. 6, 2021

(54) UNWRINKLING SYSTEMS AND METHODS

(71) Applicant: SoftWear Automation, Inc., Cumming, GA (US)

(72) Inventors: Michael J. Baker, Acworth, GA (US); Eric Guenterberg, Watertown, MA (US); Alexander Ren Gurney, Atlanta, GA (US); Sae Kwang Hwang, Edgewater, NJ (US); Senthil Ramamurthy, Atlanta, GA (US); Bryan Whitsell, Atlanta, GA (US)

(73) Assignee: SoftWear Automation, Inc., Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,933

(22) Filed: Aug. 17, 2020

(65) Prior Publication Data
US 2021/0172105 A1     Jun. 10, 2021

Related U.S. Application Data

(63) Continuation-in-part of application No. 16/704,578, filed on Dec. 5, 2019, now Pat. No. 10,745,839.

(51) Int. Cl.
D05B 35/00 (2006.01)
D05B 81/00 (2006.01)
D05B 69/30 (2006.01)
B25J 11/00 (2006.01)
B65H 7/14 (2006.01)
(Continued)

(52) U.S. Cl.
CPC ............. *D05B 35/00* (2013.01); *B25J 11/005* (2013.01); *B65H 5/36* (2013.01); *B65H 7/14* (2013.01); *D05B 69/30* (2013.01); *D05B 81/00* (2013.01); *G06T 7/0004* (2013.01);
(Continued)

(58) Field of Classification Search
CPC ........ D05B 19/16; D05B 35/00; D05B 81/00; D05B 3/04; D05B 27/08; D05B 27/06; B25J 11/005; B65H 5/36
See application file for complete search history.

(56) References Cited

U.S. PATENT DOCUMENTS 3,721,809 A * 3/1973 Strandberg, Jr. ........ G01N 33/36
                                                         377/2
4,898,110 A * 2/1990 Nomura ................. D05B 27/06
                                                        112/314
(Continued)

*Primary Examiner* — Tajash D Patel
(74) *Attorney, Agent, or Firm* — Thomas|Horstemeyer, LLP

(57) ABSTRACT

Due to rapid advancement in computing technology of both hardware and software, the labor intensive sewing process has been transformed into a technology-intensive automated process. During an automated process, product materials may become wrinkled or folded, which can slow down the automated process or result in human intervention. Various examples are provided related to the automation of sewing robots, and removal of wrinkles from products. Images of material on a work table can be captured and analyzed to determine if there are wrinkles or folds in the product. The robot can remove the wrinkle or fold by manipulating the material through the use of end effectors such as, e.g., budgers.

20 Claims, 7 Drawing Sheets

(51) Int. Cl.
*G06T 7/00* (2017.01)
*B65H 5/36* (2006.01)

(52) U.S. Cl.
CPC ... *B65H 2701/174* (2013.01); *D05D 2305/36* (2013.01); *G06T 2207/30124* (2013.01)

(56) References Cited

U.S. PATENT DOCUMENTS

| | | | | |
|---|---|---|---|---|
| 5,001,998 | A * | 3/1991 | Suzuki | D05B 27/06 112/277 |
| 6,499,513 | B1 * | 12/2002 | Couch | A41H 3/08 112/470.03 |
| 8,573,145 | B2 * | 11/2013 | Dickerson | D05B 3/04 112/470.02 |
| 9,079,736 | B1 * | 7/2015 | Muir | B65H 23/038 |
| 10,745,839 | B1 * | 8/2020 | Baker | D05B 35/00 |
| 2012/0060735 | A1 * | 3/2012 | Dickerson | D05B 27/08 112/313 |

* cited by examiner

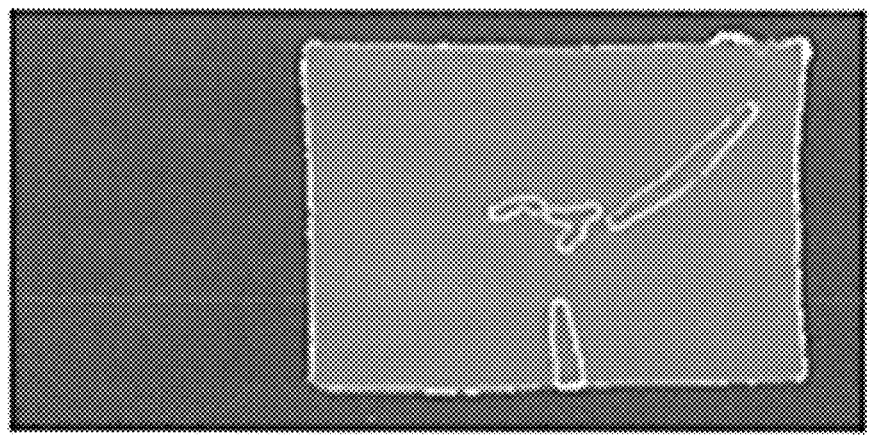
FIG. 7A
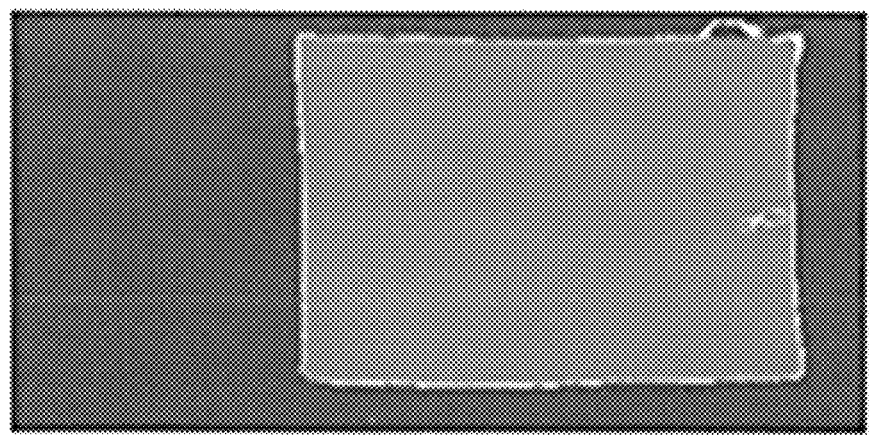
FIG. 7B
| End Effectors | Budger | Mechanical Arm | Clamp | End Effector N |
|---|---|---|---|---|
| Budger | X | X | X | X |
| Mechanical Arm | X | X | X | X |
| Clamp | X | X | X | X |
| End Effector N | X | X | X | X |
FIG. 8

UNWRINKLING SYSTEMS AND METHODS

CROSS REFERENCE TO RELATED APPLICATIONS

This application is a continuation-in-part claiming priority to, and the benefit of, co-pending U.S. non-provisional application entitled "Unwrinkling Systems and Methods" having Ser. No. 16/704,578, filed Dec. 5, 2019, the entirety of which is hereby incorporated by reference.

FIELD OF THE DISCLOSURE

The present disclosure is generally related to the automation of sewing using sewing robots. More specifically, the disclosure is related to dealing with products that wrinkle during an automated sewing process.

BACKGROUND

Clothing is one of the necessities of human life and a means of personal expression. As such, clothing or garment manufacturing is one of the oldest and largest industries in the world. However, unlike other mass industries such as the automobile industry, the apparel industry is primarily supported by a manual production line. The need for automation in garment manufacturing has been recognized by many since the early 1980s. During the 1980s, millions of dollars were spent on apparel industry research in the United States, Japan and industrialized Europe. For example, a joint $55 million program between the Ministry of International Trade and Industry (MITI) and Industry, called the TRAAS, was started in 1982. The goal of the program was to automate the garment manufacturing process from start, with a roll of product, to finish, with a complete, inspected garment. While the project claimed to be successful and did demonstrate a method to produce tailored women's jackets, it failed to compete with traditional methodologies.

Currently, a sewing machine uses what is known as a feed dog to move the product through the sewing head relying on the operator to maintain the product orientation and keep up with the feed rate for the rest of the good. Previous attempts at automated sewing used the feed dogs on a standard sewing machine and had a robot perform exactly the operations a human user would perform. Desirable in the art is an improved automated sewing machine that would improve upon the conventional automated sewing designs that are unable to process wrinkles and/or folds, which may be introduced while the product to be sewn is moving on a robotic sewing system. The value of this disclosure is to provide a flat piece of a product to be sewn for an automated sewing machine allowing the machine to function properly without mistakes caused by a wrinkle or bump in the product to be sewn.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

FIGS. 7A and 7B illustrate a wrinkle removal example, according to various embodiments of the present disclosure.

FIG. 8 illustrates an end effector example, according to various embodiments of the present disclosure.

DETAILED DESCRIPTION

Disclosed herein are various examples related to automation of sewing using sewing robots. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
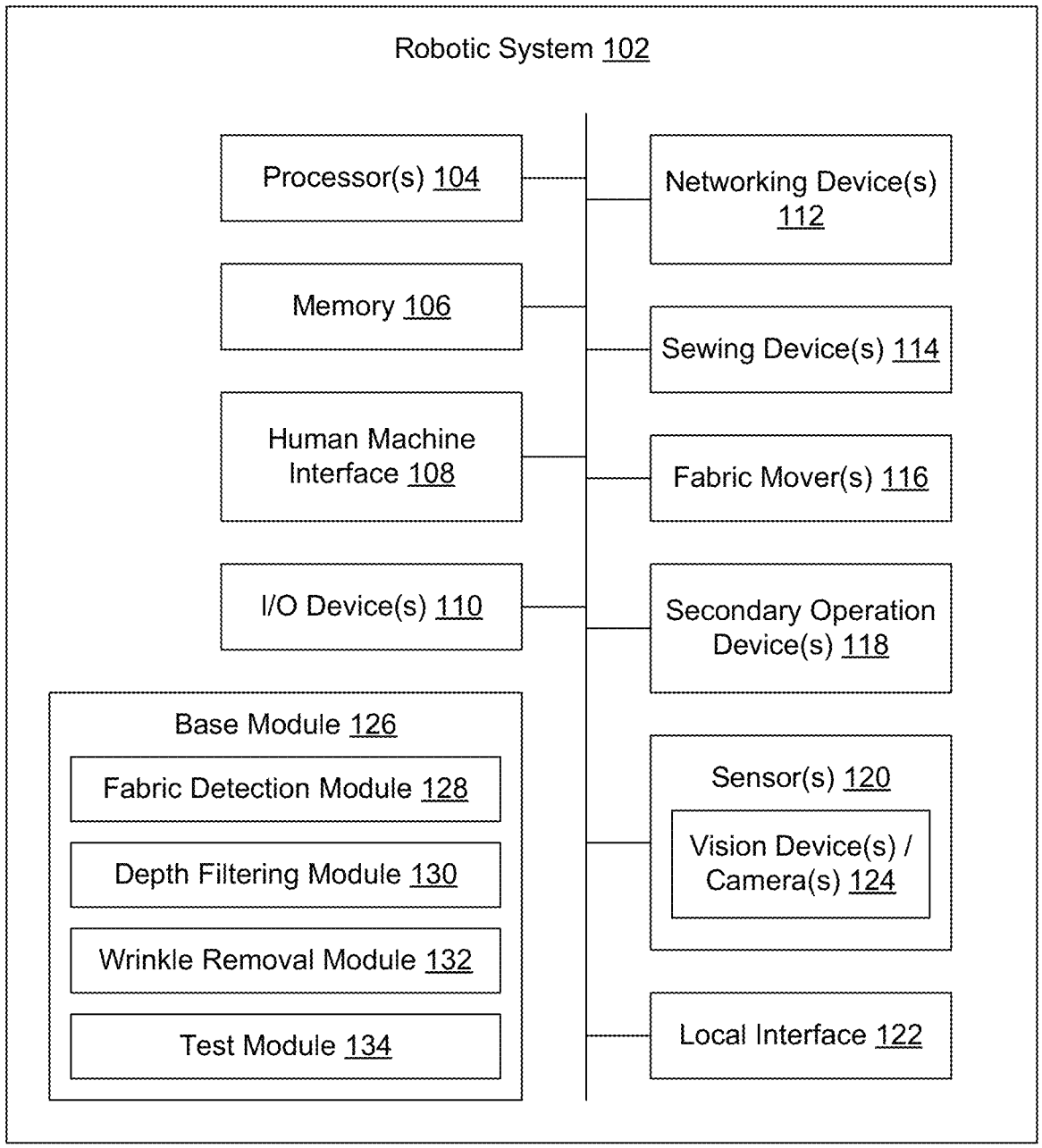
FIG. 1 illustrates an example of a wrinkle removal system, according to various embodiments of the present disclosure.

Referring to FIG. 1, shown in an example of a wrinkle removal system. As illustrated in the example of FIG. 1, the system can comprise a robotic system 102, which can include a processor 104, memory 106, an interface such as, e.g., a human machine interface (HMI) 108, I/O device(s) 110, networking device(s) 112, a sewing device 114, fabric mover(s) 116, secondary operation device(s) 118, sensor(s) 120, and a local interface 122. Sensor(s) 120 can include, but are not limited to, devices that can detect wrinkles using, e.g., electromagnetic field (EMF), ultrasound, physical touch, or other sensing technology. The sensor(s) 120 can comprise a vision device or camera 124 such as, e.g., a RGB camera, an RGB-D camera, a near infrared (NIR) camera, stereoscopic camera, photometric stereo camera (single camera with multiple illumination options), etc. The robotic system 102 can also include a base module 126, a fabric detection module 128, a depth filtering module 130, a wrinkle removal module 132, and/or a test module 134, which may be executed to implement wrinkle removal.

The robotic system 102 can move a piece of product across a surface of a work table and determine if the piece of product contains any wrinkles through the base module 126. If it is determined that the product contains a wrinkle, through the depth filtering module 130, the wrinkle removal module 132 can initiate fabric movers 116, or material movers, (e.g., budgers, fingers, air jets, etc.) to move in specific directions to remove the wrinkle from the product. The test module 134 can then test the product to determine if the wrinkle has been removed or is still present. If the wrinkle is still present, the wrinkle removal module 132 can be initiated again, by the robotic system 102.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a human machine interface (HMI), a voice interface, or a web-based user-interface, at element 108.

The input/output devices or I/O devices 110 of the robotic system 102 can comprise components used to facilitate connections of the processor 104 to other devices such as, e.g., a knife device, sewing device 114, fabric (or material) mover(s) 116, secondary operation device(s) 118 and/or sensor(s) 120 and therefore, for instance, can comprise one or more serial, parallel, small system interface (SCSI), universal serial bus (USB), or IEEE 1394 (i.e. Firewire™) connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The sewing device 114 of the robotic system 102 facilitates sewing the product materials together and can be configured to sew a perimeter or along markings on the product material based on tracking a generated pattern. In additional embodiments, the sewing device 114 can include a knife device in order to cut threads, stitches, materials from the workpiece etc. The fabric mover(s) 116, or material mover(s), of the robotic system 102 can facilitate moving the product material(s) during the cutting and sewing operations, at element 116. The fabric, or material, mover(s) 116 can comprise end effectors, pneumatics, edge controls, or other appropriate material manipulator(s). The secondary operation device(s) 118 can include stacking device(s), folding device(s), label manipulation device(s), and/or other device(s) that assist with the preparation, making and/or finishing of the sewn product.

The sensor(s) 120 of the robotic system 102 can facilitate detecting the movement of the product material(s) and inspecting the product material(s) for defects and/or discrepancies during a sewing and cutting operation. Further, the vision device(s) 124 can facilitate detecting markings on the product before cutting or sewing the material. A sensor 120 can comprise, but is not limited to, camera(s) and/or vision device(s) 124 such as, e.g., an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc., at element 120. The RGB-D camera is a digital camera that can provide color (RGB) and depth information for pixels in an image.

The local interface 122 of the robotic system 102 can be, for example, but not limited to, one or more buses or other wired or wireless connections, as is known in the art. The local interface 122 can have additional elements, which are omitted for simplicity, such as controllers, buffers (caches), drivers, repeaters, and receivers, to enable communications. Further, the local interface 122 can include address, control, and/or data connections to enable appropriate communications among the components, at element 122.

As shown in FIG. 1, the robotic system 102 includes a base module 126 which can activate the fabric detection module 128, depth filtering module 130, wrinkle removal module 132, and test module 134, as will be discussed. The fabric detection module 128 can determine if a piece of product material has moved on the work table within the RGB-D camera's (or vision device 124) view. The depth filtering module 130 can analyze the captured image(s) to determine if a wrinkle is present on the product material. If there is a wrinkle, this information is returned to the wrinkle removal module 132, at element 130. The wrinkle removal module 132 can determine and activate the necessary budgers (or other fabric or material mover(s) 116) on the work table to remove the wrinkle found by the depth filtering module 130 and initiates the test module 134 to determine if there are any wrinkles remaining, at element 132. The test module 134 which is initiated by the wrinkle removal module 132, performs a task similar to the depth filtering module 130 to determine if there are any wrinkles remaining within the piece of the product. If there are no more wrinkles, then the process ends. However, if there are wrinkles remaining the test module 134 initiates the wrinkle removal module 132 to remove the remaining wrinkles, at element 134.

An example of wrinkle removal is displayed by the two images of FIGS. 7A and 7B. FIG. As will be discussed, 7A shows an image of a piece of the product material that contains a wrinkle and FIG. 7B shows the piece of product that does not contain the wrinkle as will be discussed. The wrinkle can be reduced or removed using fabric, or material, mover(s) 116 such as end effectors, pneumatics, edge controls, or other appropriate material manipulator(s). An end effector example is provided in FIG. 8, which displays a series of end effectors that may be used as opposed to or in combination with, e.g., the budger system disclosed in U.S. Pat. No. 8,997,670 ("Conveyance System that Transports Fabric"), which is hereby incorporated by reference in its entirety. A budger can include a steered ball that can rotate in two perpendicular axis. Traction between the product material and the ball can be enhanced by a slight vacuum drawing a flow of air through the product via a series of holes in the ball. An array of small budgers can be used to transport the product to the sewing device 114, and ensure that the product material lays flat in the correct orientation and without wrinkles.

Pneumatics such as, e.g., directional air jets blowing perpendicular to the wrinkle's primary (or longitudinal) axis can be used to pull the wrinkle out of a piece of product material. Blowers can be embedded in the work table (or work surface). The separate blowers can supply a controlled air flow through nozzles or orifices that provide directional control or can be configured to rotate to direct air flow. In alternative embodiments, blowers can be suspended above the worksurface or attached to an industrial robot to direct air jets for smoothing the piece of product material. In some embodiments, blowers may be mounted in a fixed location and the fabric or material mover(s) can shift the piece of product material to appropriately orient it with respect to the blowers for removal.

The piece of product material on either side of the wrinkle can also be spread apart through mechanical actuation or manipulation. Two separate end effectors can be positioned on either side of the wrinkle and move apart. In other embodiments, a single split end effector with actuation can be positioned over the wrinkle and moved apart. In alternative embodiments, a single belt or an array of belts on one or both sides of the wrinkle can be used to move the material. In some embodiments, the product material can be moved from underneath or above by driven rollers or wheels (e.g., budgers) that may or may not have directional control. In various embodiments, the wrinkle can be positioned over a conveyor or similar moving surface which can adjust the piece of product material. The conveyor or moving surface may or may not reciprocate or be flexible. For example, the surface can be configured to shift by a constrained amount, e.g., 100 mm or less.

The piece of product material can be adjusted in one or more directions to reduce or remove the wrinkle. The edge of the piece of product material or near the edge of the material may be secured in place (e.g., using a clamp, suction, etc.) at one or more locations appropriate to the location of the wrinkle, or can be secured to an actuator or end effector which may be moving the piece of product. The piece of product material can then be adjusted to remove it. The adjustments can be carried out while the piece of product material is stationary or in motion (e.g., during processing of the piece of product). The material can be pulled or manipulated as described. The adjustment can be applied along one or more edges to remove the wrinkle. The material may be secured (clamped) at an edge or near an edge on the other side of the wrinkle, or the piece of product material may be adjusted without being secured along an edge.

In various embodiments, a constant or intermittent tension can be applied to the piece of product material in some or all directions to remove or prevent wrinkles. For instance, concentric rings of air jets pointing outward from a center point can tension a piece of product positioned or moving over the air jets to remove or prevent wrinkles in the material. In some implementations, adjustments can be made to remove the wrinkle during movement of the piece of product material by the actuators or end effectors. For example, budgers can apply tension to a piece of product while they are moving it on a work surface. A velocity vector pointing away from the center of the piece of product or from the wrinkle can be added to the budger's base motion to remove the wrinkle. Adjustments can also be applied during sewing or other processing of the piece of product material.

Functioning of the base module 126 of the robotic system 102 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
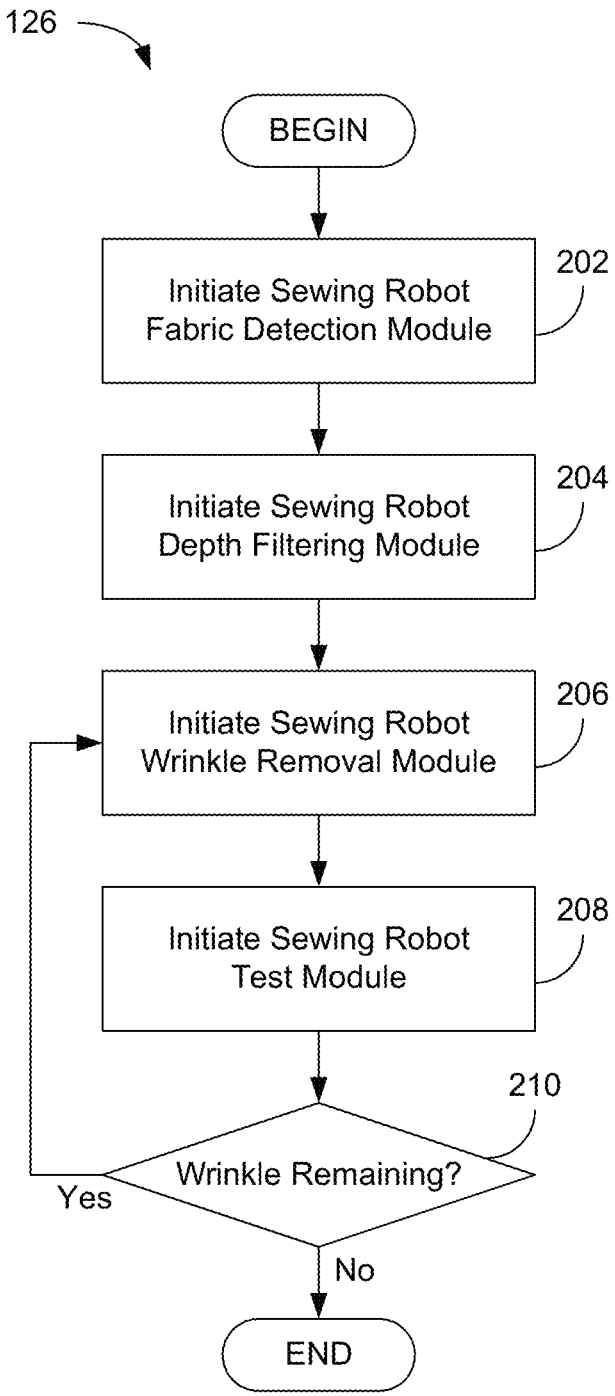
FIG. 2 illustrates an example of a base module, according to various embodiments of the present disclosure.

The flow chart of FIG. 2 shows the architecture, functionality, and operation of a possible implementation of the base module 126. The process begins at 202 with the base module 126 initiating the fabric detection module 128 of the robotic system 102, which captures one or more (e.g., a series of) images using one or more sensor(s) 120 such as, e.g., the RGB-D camera in order to determine if a piece of a product has been identified and returns to the base module 126. Next, the depth filtering module 130 of the robotic system 102 is initiated at 204. The depth filtering module 130 analyzes the images captured at 202 from the fabric detection module 128 and determines if the product contains a wrinkle and returns to the base module 126.

At 206, the wrinkle removal module 132 is initiated and determines which fabric mover(s) 116 such as, e.g., one or more budger(s) should be initiated in order to remove the identified wrinkle and activates the necessary budgers (or other fabric mover(s) 116) to remove the wrinkle from the product material, and then captures another series of images using the sensor(s) 120 (e.g., the RGB-D camera) and returns to the base module 126. In some implementations, fabric mover(s) 116 to remove the wrinkle can be identified by the depth filtering module 130. Then at 208, the test module 134 is initiated, which analyzes one or more new images, or other sensor data, captured in the wrinkle removal module 132 to determine if there are any wrinkles remaining (or unacceptable for processing the piece of the product. If there are wrinkles remaining at 210, then the process returns to 206 and initiates the wrinkle removal module 132. If it is determined through the test module 134 that there are no wrinkles remaining at 210, then the process returns to the base module 126 and the process ends.

Functioning of the fabric detection module 128 will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
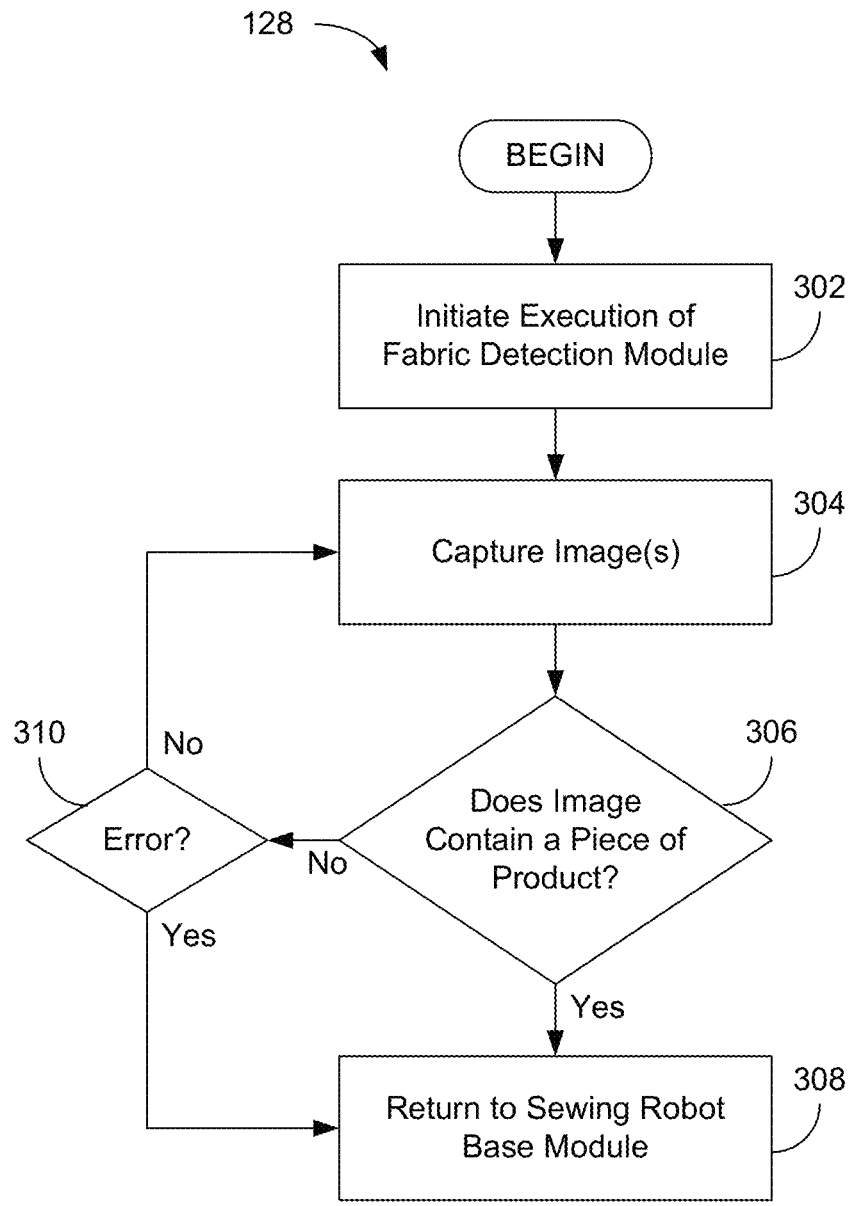
FIG. 3 illustrates an example of a fabric detection module, according to various embodiments of the present disclosure.

The flow chart of FIG. 3 shows the architecture, functionality, and operation of a possible implementation of the fabric detection module 128. The process begins at 302 with the fabric detection module 128 being initiated by, e.g., the base module 126, at 202 of FIG. 2. At 304, the sensor 120, vision device 124 or camera on the robotic system 102 (FIG. 1), which may be a single camera or multiple cameras, can capture one or more images of at least a portion of the work table (or work surface). There may be multiple images captured and the vision device 124 or camera can be the RGB-D camera. An RGB-D camera is a digital camera that can provide color (RGB) and depth information for pixels in a captured image, at 304. In some implementations, images can be captured at a fixed frequency (e.g., 10 Hz) or interval during processing or handling of the piece of product.

Next, the fabric detection module 128 determines if the captured image(s) contain a piece of the product (or work piece) at 306. This can be accomplished by continuously comparing the images to a template image of the work table (or work surface) and, if there is any difference, then it can be determined that a piece of the product is contained in the images. Other implementations can use image statistics or its derivatives, which may be used independently or in combination. For example, a chan-vese algorithm for image segmentation can maximize the separation between mean intensities of two regions (e.g., an object and background). The difference in color in the captured images and the template image of the work table can be considered. For example, if the work table is white in color and the pieces of the product material are blue, then when the captured images contain any blue it may be determined that a piece of the product is contained in the images, at 306. If it is determined at 306 that the images contain a piece of the product then the fabric detection module 128 returns at 308 to the base module 126 (FIG. 2), where the depth filtering can be initiated at 204. If it is determined that the captured images do not contain a piece of the product at 306, then the process can determine if there was an error at 310. For example, if a piece of the product was scheduled for delivery by a stacking device but is identified at 306, then an error indication can be provided to, e.g., an operator for appropriate action or the robotic system 102 can be stopped. If no error is present at 310, then the process returns to 304 where additional images can be captured to detect the presence of product material on the work table. If there is an error, the process can return to the base module 126 at 308.

Functioning of the depth filtering module 130 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
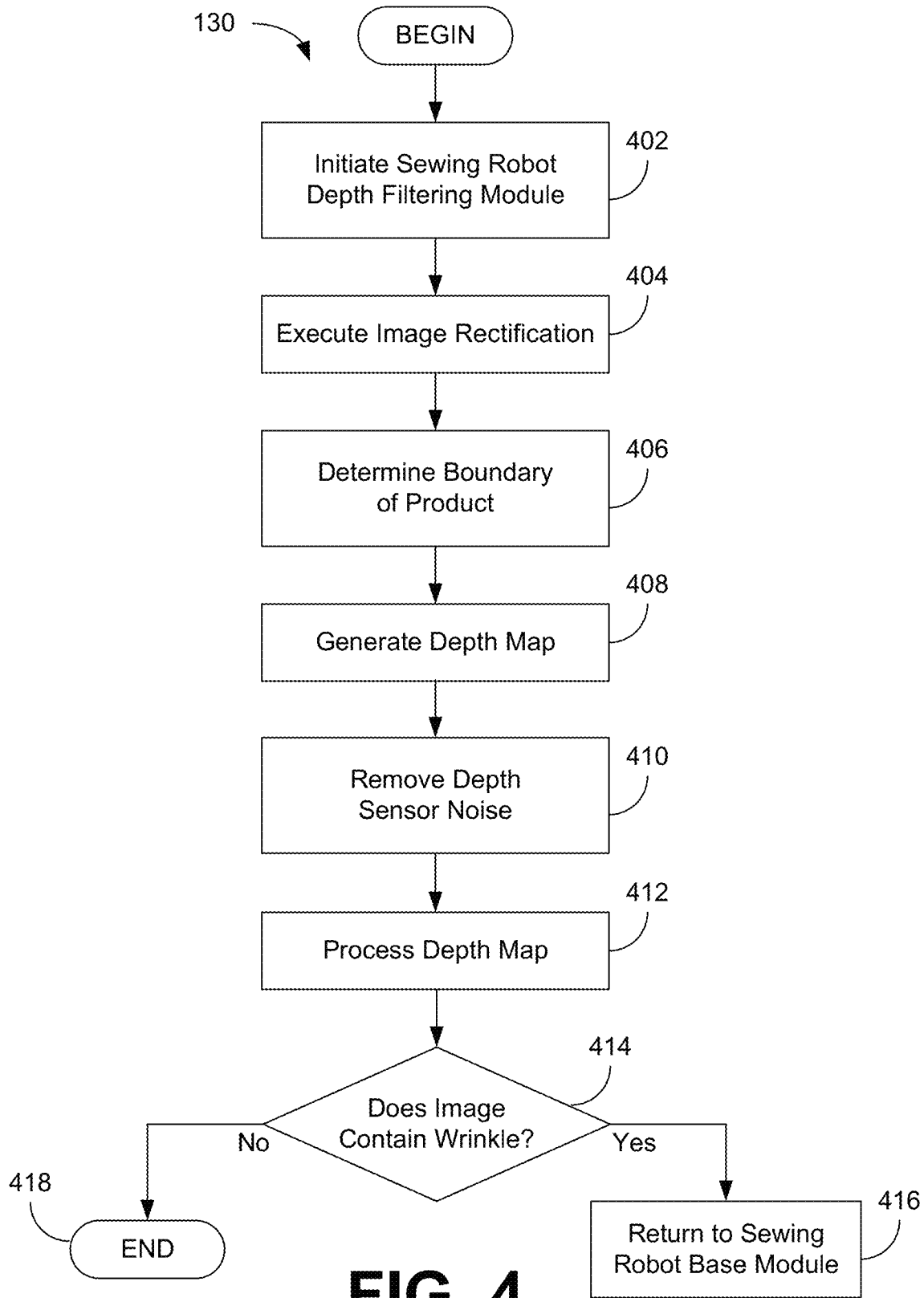
FIG. 4 illustrates an example of a depth filtering module, according to various embodiments of the present disclosure.

The flow chart of FIG. 4 shows the architecture, functionality, and operation of a possible implementation of the depth filtering module 130. The process begins at 402 with the depth filtering module 130 being initiated by, e.g., the base module 126, at 204 of FIG. 2. At 404, the depth filtering module 130 performs an image rectification process, which is a transformation process used to project images on a common plane. It can be used in geographic information systems to merge images taken from multiple perspectives into a common map coordinate system, which in this process may be used to determine if a piece of product is lying flat on the work table or contains a wrinkle. The depth filtering module 130 can then determine the boundary of the product at 406. The boundary of the product can be determined from color images using a variety of techniques such as, e.g., an image segmentation that can include a Gaussian Mixture Model, which allows the foreground of a captured image to be extracted for further processing by removing the background. Some implementations can include the use of object recognition at 406 in order to determine the boundaries of the piece of product.

Next, the depth filtering module 130 generates a depth map of the piece of product (or work piece) at 408 using information from the captured images and/or other sensors. Generating the depth map can include performing an image registration process at 408, which overlays two or more images from various sensors 120 such as imaging equipment or other sensors taken at different times and/or angles or from the same scene to geometrically align the images for analysis. The sensor(s) 120 used in this process can be any one of, but not limited to, an RGB-D camera, time of flight camera, IP camera, light-field camera, monorail camera, multiplane camera, rapatronic camera, stereo camera, still camera, thermal imaging camera, acoustic camera, rangefinder camera, etc.

Various approaches can be used to generate the depth map. For example, stereo vision can use two optically identical cameras that are calibrated and separated by a known distance along a baseline. The image of the work piece on the work table can be acquired by the cameras concurrently. The perspective projection of the piece of product on the two cameras produces a slightly shifted version of the same scene which can be used to determine 3D information.

Feature descriptors such as, e.g., scale invariant feature transform (SIFT) or histogram of gradients (HoG) can be used to select image features in the reference image. A disparity map can then be calculated by finding the corresponding points for the feature descriptors in the match image. The corresponding feature points can be found by using a variety of techniques, such as Sum of Squared Differences (SSD) or Absolute intensity Differences (AD). The unconstrained search space can be the entire second image, however this search space can be limited by taking advantage of the epipolar geometry. This geometry describes the intrinsic projective geometry relationship between two views. The search space can thus be reduced to be a one dimensional epipolar line in the second image. The orientation of the epipolar line can be further constrained by applying a homography to each image, such that the reprojected image planes are parallel to each other. This transformation ensures that epipolar line is aligned along the horizontal axis of the second image to further reduce the computational burden. The search for the feature descriptor is executed along this horizontal epipolar line. The difference in positions of the feature descriptor in the two images provide the disparity metric for the feature descriptor. This is repeated for all the feature descriptors fin the first image. The depth map is inversely proportional to the disparity map and the constant of proportionality can be calculated by triangulation.

Another approach to generate a depth map can use active stereo vision where one of the cameras of the stereo system is replaced by a structured light (an intense beam of coherent light such as, e.g., a laser) projector. For a calibrated projector, the correspondence problem can be solved by searching for the projected line in the camera image (match image). This search can be further constrained by the fact that the order of corresponding points remain unchanged. The disparity map can be constructed by raster scanning the object in the scene with the projector and building the disparity map one line at a time.

At 410, the depth filtering module 130 can remove any depth sensor noise, or any other undesired effects using, e.g., temporal and spatial image filters. For example, the depth map can be preprocessed by a spatio-temporal filter operating simultaneously across multiple images (space and time) to mitigate the measurement noise. Any depth bias, which may arise from an uneven table, can be removed with model-fitting or look-up table approaches. In various implementations, the look-up tables can be calculated or estimated frame by frame in close to real-time or the look-up tables may be precomputed in advance. In some implementations, the boundary detection at 408 can be implemented after the depth map is generated in order to utilize information from the depth map.

The depth map can then be processed at 412 to determine if the image of the piece of product contains a wrinkle or multiple wrinkles. As a preprocessing step, the imaging plane in the 3D scene (work table surface) can be transformed to be parallel to the image sensor plane, such that it its normal is aligned along the optical axis of the image camera, using a transformation (homography). This homography can be calculated from the known geometry and intrinsic parameters of the imaging system (camera) and 3D scene.

The depth map can be further used to model the object (piece of product) in the scene to be imaged can be modeled as a two dimensional rough surface (a surface with large deviations in the local normal vector with respect to it planar vector). A height distribution model can be calculated for the rough surface, and the height of surface can be modeled as a two dimensional probability distribution. Prior knowledge about the surface properties of the piece of product being imaged can be used to refine the estimated height distribution model. First, statistical height descriptors can be calculated as a measure of average roughness at a local scale, and spatial descriptors such as peak density, zero crossing density etc. can be calculated to model the height distribution at a global (image) scale. A wrinkle can be characterized by appreciable variations in both local and global descriptors, compared to those of a planar surface. The height and spatial descriptors can be processed (e.g., by a higher level decision making algorithm) to identify the areas of the image containing a wrinkle.

The surface map of the object offers another representation of the depth map. The local curvatures can be calculated from the surface map. The local curvatures describe the individual and joint curvature along its axes of the image. A wrinkle can be characterized by a ridge that travels along the wrinkle and a curved shape in the other direction. The principal axes of curvature can be calculated using eigenvector analysis on the matrix describing the local curvature. The largest (of the two) eigenvector points in the direction that the fabric should be tensioned to remove the wrinkle. Tensioning fabric in that direction with fabric mover(s), or material mover(s), can dewrinkle the fabric.

The presence of a wrinkle can be evaluated based upon a wrinkle profile that can include models, parameters, limits, thresholds, etc. related to various wrinkle characteristics such as, e.g., ridge height, ridge width, orientation, etc. that can specify acceptable conditions or criteria for processing of the piece of the product. The wrinkle profile can also account for which sensors 120 or vision devices 124 are used to capture the images. If the product does contain a wrinkle at 414, the depth filtering module 130 returns to the base module 126 (FIG. 2) at 416, where wrinkle removal can be initiated at 206. If it is determined that no wrinkles are identified or remain in the product, then the process ends at 418.

Functioning of the wrinkle removal module 132 will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
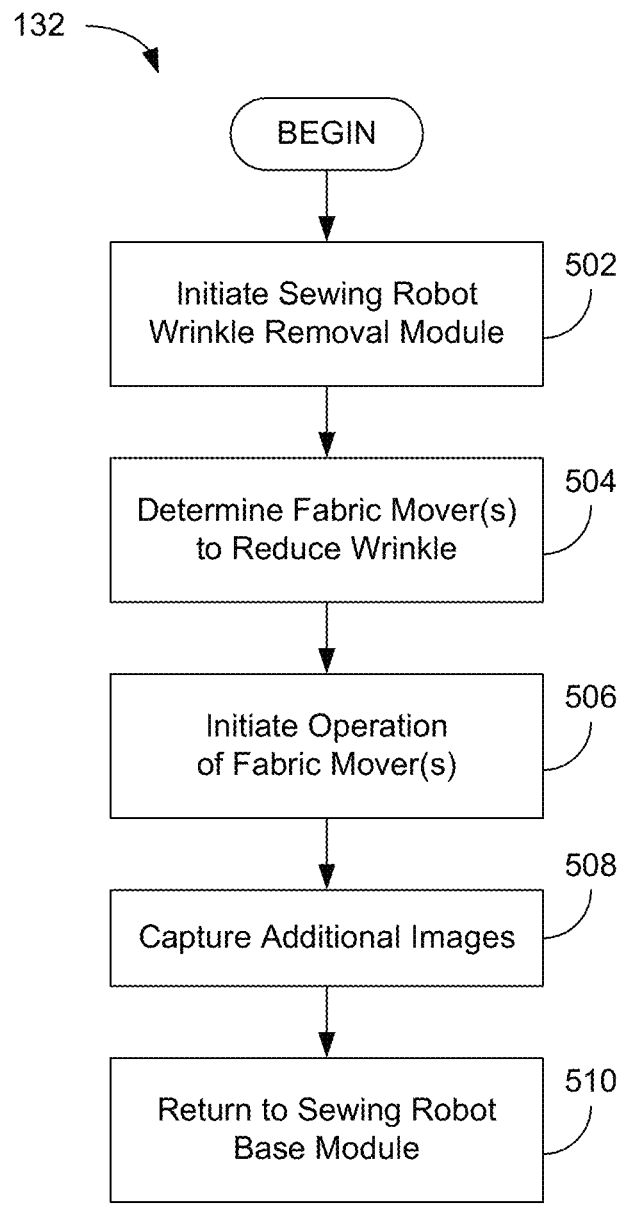
FIG. 5 illustrates an example of a wrinkle removal module, according to various embodiments of the present disclosure.

The flow chart of FIG. 5 shows the architecture, functionality, and operation of a possible implementation of the wrinkle removal module 132. The process begins at 502 with the wrinkle removal module 132 being initiated by, e.g., the base module 126, at 206 of FIG. 2. Then at 504 the wrinkle removal module 132 determines the budgers (or other fabric mover(s), or material mover(s), 116 of FIG. 1) needed to remove the wrinkle or wrinkles. This can be accomplished by the robotic system 102 knowing the location of all the budgers on the work table and the location of the product on the work table (or surface). An algorithm can determine which budgers or other fabric mover(s) 116 surrounding the location of the wrinkle on the product can be used to straighten out the wrinkle and what corrective actions are needed to remove the wrinkle, at 504. The product can be manipulated to adjust multiple wrinkles at the same time. At 506, the wrinkle removal module 132 initiates activation of the identified budgers or fabric mover (s) 116 to remove the wrinkle from the product material. For example, the activated budgers can be initiated or controlled to turn, rotate, or move in a specific direction to reduce or remove the wrinkle. In some implementations, budgers may not be the only actuator used. For example, the robotic system 102 could use a mechanical arm, clamp, and/or various other types of end effectors, or some combination of these, in order to reduce or remove the wrinkles.

It should be noted, that the role of a budger system is to simultaneously move and feed product parts to other robotic systems using a set of distributed actuators. Each budger can move the product in contact with that budger independently in a given direction and/or at a given speed. Wrinkles and/or folds may be introduced while the product is moving on the budger system. Those budgers may also be used to correct wrinkles and folds through differential movement of the budgers. In addition, the budgers may be used in the sewing process by manipulating the products position while it is being sewn. Next, the vision device(s) 124 or camera captures one or more additional images of the piece of product at 508. In some implementations, images can be captured at a fixed frequency (e.g., 10 Hz) or interval during processing or handling of the piece of product. Then at 510, the wrinkle removal module 132 returns to the base module 126 (FIG. 2), where testing to confirm that the wrinkle has been reduced or removed can be initiated at 208.

Functioning of the test module 134 will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
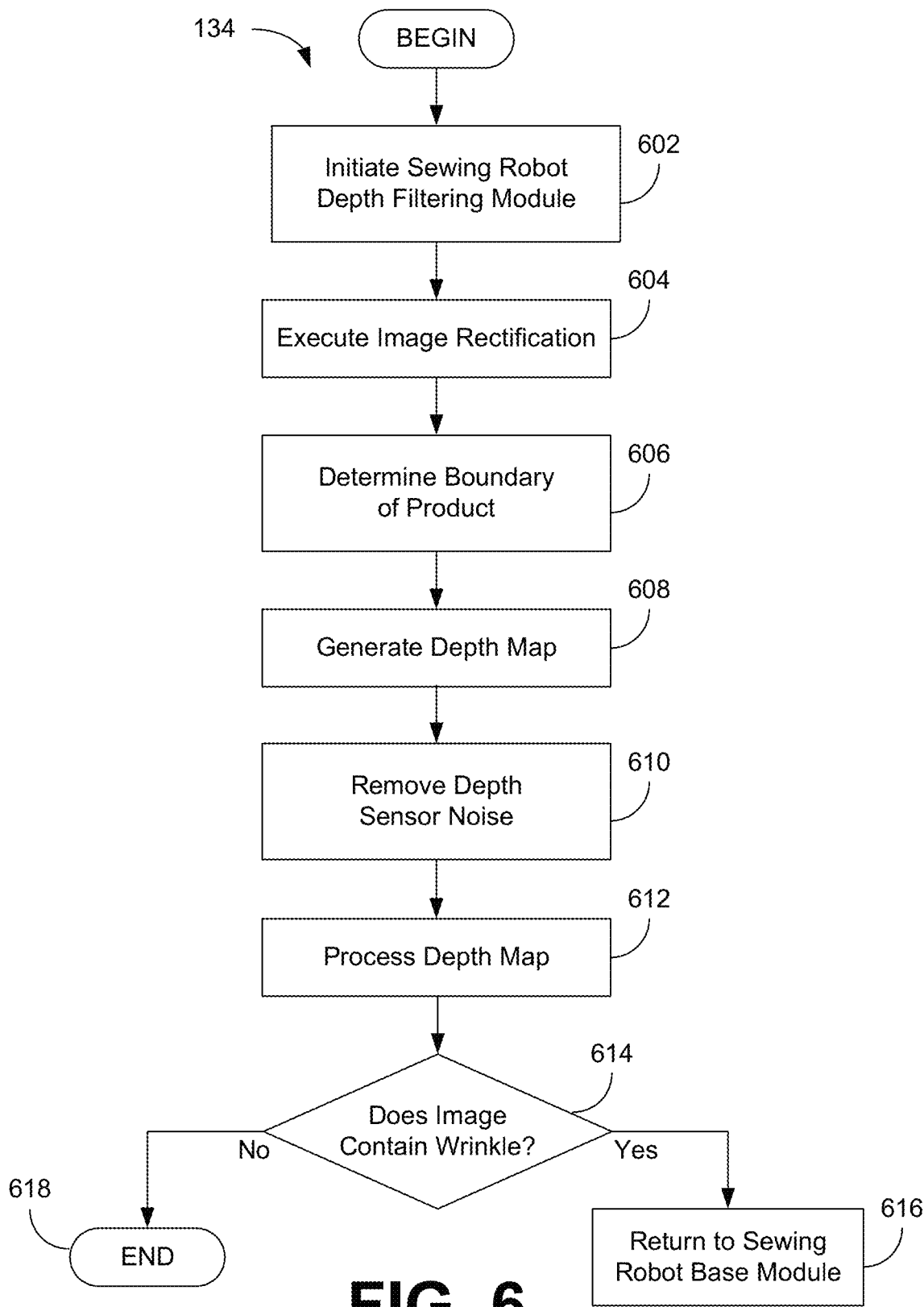
FIG. 6 illustrates an example of a test module, according to various embodiments of the present disclosure.

The flow chart of FIG. 6 shows the architecture, functionality, and operation of a possible implementation of the test module 134. The process begins at 602 when the test module 134 is initiated by, e.g., the base module 126, at 208 of FIG. 2. The test module 134 then performs an image rectification process at 604, which is a transformation process used to project images on a common plane. It can be used in geographic information systems to merge images taken from multiple perspectives into a common map coordinate system, which in this process may be used to determine if a piece of product is lying flat on the work table or contains a wrinkle. The test module 134 can next determine the boundary of the product at 606. The boundary of the product can be determined from color images using a variety of techniques such as, e.g., an image segmentation that can include a Gaussian Mixture Model, which allows the foreground of a captured image to be extracted for further processing by removing the background. Some implementations can include the use of object recognition at 606 in order to determine the boundaries of the piece of product.

Next, the test module 134 generates a depth map of the piece of product (or work piece) at 608 using information from the additional captured image(s). Generating the depth map can include performing an image registration process at 608, which overlays two or more images from various sensors 120 and/or vision devices 124 such as imaging equipment or sensors taken at different times and/or angles or from the same scene to geometrically align the images for analysis. The vision device(s) 124 used in this process can be any one of, but not limited to, an RGB-D camera, time of flight camera, IP camera, light-field camera, monorail camera, multiplane camera, rapatronic camera, stereo camera, still camera, thermal imaging camera, acoustic camera, rangefinder camera, etc.

At 610, the test module 134 can remove any depth sensor noise, or any other undesired effects using, e.g., temporal and spatial filters. Any depth bias, which may arise from an uneven table, can be removed with model-fitting or look-up table approaches. In various implementations, the look-up tables can be calculated or estimated frame by frame in close to real-time or the look-up tables may be precomputed in advance. In some implementations, the boundary detection at 608 can be implemented after the depth map is generated in order to utilize information from the depth map.

The depth map can then be processed at 612 to determine if the piece of product still contains a wrinkle. The presence of the wrinkle can be evaluated based upon the wrinkle profile for processing of the piece of the product. If the product does contain a wrinkle at 614, the test module 134 returns to the base module 126 (FIG. 2) at 616, where wrinkle removal can be initiated at 206. If it is determined that no wrinkles are identified or remain in the product, then the process ends at 618.

Functioning of the wrinkle removal process will now be discussed with reference to the captured images of FIGS. 7A and 7B. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIGS. 7A and 7B display captured images that illustrate a wrinkle removal example. FIG. 7A of the wrinkle removal example displays an image of a piece of product that has been processed through the depth filtering module 130 or the test module 134. The lines located within the piece of product represent wrinkles, or peaks or bumps that have been identified on the product. This is the result of the analysis of the depth filtering module 130 (or the test module 134) that allows it to determine if there are wrinkles on the product, identify where those wrinkles are in relation to the budgers (or other fabric mover(s) 116) about the work table and the product, and the direction in which those budgers (or other fabric mover(s) 116) need to move in order to remove the wrinkle(s). FIG. 7B of the wrinkle removal example displays an image of a piece of product that does not contain any wrinkles. This image can be analyzed through the depth filtering module 130 or the test module 134, and since there are no wrinkles detected the process would end allowing the piece of product to continue being processed on the work table.

Referring now to FIG. 8, functioning of an example of the end effector(s) will now be explained. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 8 shows an example of a matrix of various end effectors that can be used with the robotic system 102 of FIG. 1. The table illustrates that not only budgers may be used to move and alter the product in order to remove the identified wrinkles, but this can also be accomplished through mechanical arms, clamps, or end effector N (representing a number of apparatuses or tools that may be used or a combination that may be used to move or alter the product). Multiple budgers may be used to alter the product, however a combination of budgers and mechanical arms, budgers and clamps, or budgers and end effector N may be used in order to alter and/or move the product to remove the wrinkles. Also, multiple mechanical arms or a combination of mechanical arms and clamps, or mechanical arms and end effector N may be used to move or alter the product. Additionally, multiple clamps (attached to some sort of actuator) or a combination of clamps and end effector N may be used to alter or move the product.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A robotic system, comprising:
at least one material mover;
a base module for wrinkle removal; and
processing circuitry comprising a processor, wherein execution of the base module causes the robotic system to:
receive a piece of product on a work surface; and
adjust the piece of product on the work surface using the at least one material mover to reduce a wrinkle in the piece of product on the work surface.

2. The robotic system of claim 1, comprising a vision device configured to image the work surface, wherein execution of the base module causes the robotic system to further determine whether the wrinkle after adjustment satisfies a wrinkle profile based upon analysis of one or more images obtained by the vision device of the robotic system.

3. The robotic system of claim 2, further comprising in response to the wrinkle exceeding the wrinkle profile after adjustment, execution of the base module causes the robotic system to further adjust the piece of product on the work surface to further reduce the wrinkle.

4. The robotic system of claim 1, wherein the robotic system adjusts the piece of product on the work surface to reduce the wrinkle in response to the piece of product containing the wrinkle exceeding a wrinkle profile.

5. The robotic system of claim 4, comprising:
obtaining, by a sensor, one or more images of the piece of product; and
execution of the base module determines whether the wrinkle satisfies the wrinkle profile based upon analysis of the one or more images.

6. The robotic system of claim 1, wherein presence of the piece of product is determined based upon evaluation of one or more images obtained by a sensor of the robotic system.

7. The robotic system of claim 1, wherein adjustment of the piece of product on the work surface is in response to the wrinkle exceeding a wrinkle profile.

8. The robotic system of claim 7, wherein execution of the base module determines whether the piece of product contains the wrinkle based upon analysis of one or more images with respect to the wrinkle profile.

9. The robotic system of claim 1, wherein the at least one material mover comprises a blower configured to provide directed air jets.

10. The robotic system of claim 9, wherein the air jets are directed across the piece of product substantially perpendicular to a primary axis of the wrinkle.

11. The robotic system of claim 1, wherein the at least one material mover secures an edge or near an edge of the piece of product during adjustment.

12. A method for removal of wrinkles in a piece of product by a robotic system, comprising:
receiving a piece of product;
positioning the piece of product on a work surface; and
adjusting the piece of product on the work surface using a fabric mover of the robotic system, the adjustment reducing a wrinkle in the piece of product on the work surface.

13. The method of claim 12, comprising identifying whether the piece of product on the work surface contains the wrinkle based upon one or more images obtained by a vision device of the robotic system and a wrinkle profile, wherein the piece of product is adjusted in response to the wrinkle failing to satisfy the wrinkle profile.

14. The method of claim 13, wherein identifying whether the piece of product contains the wrinkle comprises generating a depth map from of the one or more images.

15. The method of claim 12, comprising determining whether the wrinkle after adjustment satisfies a wrinkle profile based upon one or more images obtained by a vision device.

16. The method of claim 15, comprising further adjusting the piece of product on the work surface in response to failing to satisfy the wrinkle profile to further reduce the wrinkle.

17. The method of claim 12, comprising determining a boundary of the piece of product on the work surface from based upon one or more images obtained by a vision device of the robotic system.

18. The method of claim 12, wherein the adjustment reducing the wrinkle in the piece of product comprises providing directed air jets with respect to a surface of the piece of product.

19. The method of claim 18, wherein the air jets are directed across the piece of product substantially perpendicular to a primary axis of the wrinkle.

20. The method of claim 12, wherein the piece of product is adjusted during movement on the work surface.

* * * * *